US005352519A

United States Patent [19]

Stevens et al.

[11] Patent Number: 5,352,519

[45] Date of Patent: Oct. 4, 1994

[54] SULFURIZED CHAFF FIBER HAVING AN EVANESCENT RADAR REFLECTANCE CHARACTERISTIC, AND METHOD OF MAKING THE SAME

[75] Inventors: Ward C. Stevens, New Fairfield; Edward A. Sturm, New Milford; Bruce C. Roman, Cromwell, all of Conn.

[73] Assignee: Advanced Technology Materials, Inc., Danbury, Conn.

[21] Appl. No.: 982,393

[22] Filed: Nov. 27, 1992

Related U.S. Application Data

[63] Continuation-in-part of Ser. No. 450,585, Dec. 11, 1989, abandoned.

[51] Int. Cl.[5] .......................... B32B 9/00; B32B 15/00

[52] U.S. Cl. .................................... 428/389; 428/359; 428/364; 428/367; 428/375; 428/379; 428/381; 428/384; 428/388; 428/392

[58] Field of Search ............... 428/389, 388, 381, 392, 428/379, 401, 359, 432, 433, 469, 472, 472.2; 343/18 R

[56] References Cited

U.S. PATENT DOCUMENTS

| | | | |
|---|---|---|---|
| 2,682,783 | 2/1954 | Drummond | 18/54 |
| 2,818,351 | 12/1957 | Nack et al. | 117/107 |
| 2,920,981 | 1/1960 | Whitehurst | 117/71 |
| 2,930,105 | 3/1960 | Budd | 28/80 |
| 3,097,941 | 7/1963 | Toulmin, Jr. | 65/3 |
| 3,129,487 | 4/1964 | Whitacre et al. | 18/75 |
| 3,221,875 | 7/1964 | Paquette | 206/65 |
| 3,372,051 | 3/1968 | Stalego | 117/69 |
| 3,544,997 | 2/1967 | Turner et al. | 343/18 |
| 3,549,412 | 12/1970 | Frye et al. | 117/100 |
| 3,725,927 | 3/1973 | Fiedler | 343/18 |
| 3,765,931 | 10/1973 | Kyri et al. | 117/129 |
| 3,952,307 | 4/1976 | Nagler | 343/18 |
| 4,556,507 | 12/1985 | Tomibe et al. | 252/518 |
| 4,759,950 | 7/1988 | Stevens | 427/55 |
| 4,942,090 | 7/1990 | Morin | 428/367 |

OTHER PUBLICATIONS

Butters, Bryan C. F., "Electronic Countermeasures/-chaff" IEEE Proceedings, vol. 129, Part F, No. 3, Jun. 1982, pp. 197-201.

*Primary Examiner*—Pamela R. Schwartz
*Assistant Examiner*—J. M. Gray
*Attorney, Agent, or Firm*—Steven J. Hultquist

[57] ABSTRACT

An article comprising a non-conductive substrate having a sub-micron thickness of a sulfur-doped oxidizable metal coating thereon. Optionally, the sulfur-doped oxidizable metal-coated substrate may be further coated with (i) a promoter metal which is galvanically effective to promote the corrosion of the oxidizable metal, discontinuously coated on the oxidizable metal coating, and/or (ii) a salt, to accelerate the galvanic corrosion reaction by which the oxidizable metal coating is oxidized. When utilized in a form comprising fine diameter substrate elements such as glass or ceramic filaments, the resulting product may usefully be employed as an evanescent chaff. In the presence of atmospheric moisture, such evanescent chaff undergoes oxidation of the oxidizable metal coating so that the radar signature of the chaff transiently decays.

18 Claims, 6 Drawing Sheets

SULFURIZED CHAFF FIBER HAVING AN EVANESCENT RADAR REFLECTANCE CHARACTERISTIC, AND METHOD OF MAKING THE SAME

CROSS-REFERENCE TO RELATED APPLICATION

This application is a continuation-in-part of U.S. application No. 07/450,585 filed Dec. 11, 1989, now abandoned.

BACKGROUND OF THE INVENTION

1. Field of the Invention

This invention relates to chaff with a transient radar reflectance characteristic, having utility as an electronic warfare countermeasure useful as an electromagnetic detection decoy or for anti-detection masking of an offensive attack.

2. Description of the Related Art

In modern warfare, a wide variety of weapons systems are employed which operate across the electromagnetic spectrum, including radio waves, microwaves, infrared signals, ultraviolet signals, x-rays, and gamma rays.

To counter such weapons systems, smoke and other obscurants have been deployed. In the past, smoke has been variously employed as a means of protection of ground-based military vehicles and personnel during conflict, to blind enemy forces, to camouflage friendly forces, and to serve as decoys to divert hostile forces away from the positions of friendly forces. With the evolution of radar guided missiles and increasing use of radar systems for battlefield surveillance and target acquisition, the obscurant medium must provide signal response in the millimeter wavelengths of the electromagnetic spectrum.

The use of "chaff", viz., strips, fibers, particles, and other discontinuous-form, metal-containing media to provide a signal response to radar, began during World War II. The first use of chaff involved metal strips about 300 millimeters long and 15 millimeters wide, which were deployed in units of about 1,000 strips. These chaff units were manually dispersed into the air from flying aircraft, to form chaff "clouds" which functioned as decoys against radars operating in the frequency range of 490–570 Megahertz.

Chaff in the form of aluminum foil strips has been widely used since World War II. More recent developments in chaff technology include the use of aluminum-coated glass filament and silver-coated nylon filament.

In use, chaff elements are formed with dimensional characteristics creating dipoles of roughly one-half the wavelength of the hostile electromagnetic system. The chaff is dispersed into a hostile radar target zone, so that the hostile radar "locks onto" the signature of the chaff dispersion. The chaff is suitably dispersed into the air from airborne aircraft, rockets or warheads, or from ground-based deployment systems.

The chaff materials which have been developed to date function effectively when deployed at moderate to high altitudes, but are generally unsatisfactory as obscuration media in proximity to the ground due to their high settling rates. Filament-type chaff composed of metal-coated fibers may theoretically be fashioned with properties superior to metal strip chaff materials, but historically the "hang time" (time aloft before final settling of the chaff to the ground) is unfortunately still too short to accommodate low altitude use of such chaff. This high settling rate is a result of large substrate diameters necessary for standard processes, typically on the order of 25 microns, as well as thick metal coatings which increase overall density. A further problem with metallized filaments is that typically metal coatings, such as aluminum, remain present and pose a continuing electrical hazard to electrical and electronic systems after the useful life of the chaff is over.

It would therefore be a substantial advance in the art to provide a chaff material which is characterized by a reduced settling rate and increased hang time, as compared with conventional chaff materials, and which overcomes the persistence of adverse characteristics which is a major disadvantage of conventional chaff materials.

Accordingly, it is an object of the present invention to provide an improved chaff material which overcomes such difficulties.

It is another object of the present invention to provide a chaff material having a metal component with an evanescent electromagnetic detection signature.

It is another object of the present invention to provide a chaff material whose electronic signature may be selectively adjusted so that the chaff material is transiently active for a predetermined time, consistent with its purpose and its locus of use.

Other objects and advantages of the present invention will be more fully apparent from the ensuing disclosure and appended claims.

SUMMARY OF THE INVENTION

In one aspect, the present invention relates to an article comprising a non-conductive substrate having a sub-micron thickness of a sulfurized, oxidizable metal coating thereon. The sulfurized, oxidizable metal coating comprises a metal coating which has been doped with a reactive sulfur constituent in an amount and form which is (i) non-protective of the oxidizable metal coating in exposure to oxygen and/or moisture (e.g., water per se as well as relative humidity (atmospheric) moisture) and (ii) effective to promote the corrosion of the oxidizable metal when the article is exposed to atmospheric exposure conditions. The sulfurized metal coating may for example comprise from about 0.01 to about 35% by weight, and more preferably from about 0.01 to about 10.0% by weight, based on the weight of oxidizable metal, of elemental sulfur associated with an oxidizable metal coating.

The oxidizable metal employed in the coated article of the present invention may suitably comprise a metal selected from the group consisting of iron, nickel, copper, zinc, and tin, and combinations thereof. Preferably the oxidizable metal is iron, due to its low cost, ease of oxidation, and low toxicity.

In another aspect, the present invention relates to an article as broadly described above, having (i) a promoter metal which is galvanically effective to promote the corrosion of the oxidizable metal, discontinuously coated on the sulfurized, oxidizable metal coating, and/or (ii) a salt on the sulfurized, oxidizable metal coating.

The non-conductive substrate may be formed of any of a wide variety of materials, including glasses, polymers, preoxidized carbon, and ceramics, with glasses, particularly silicate glasses, generally being preferred. For chaff applications, the substrate preferably is in the form of a filament, which may for example be on the order of 0.5 to about 25 microns in diameter, with 2–15 microns being preferred.

The reactive sulfur constituent associated with the oxidizable metal coating may be present on and/or within the oxidizable metal coating, in any suitable form. As used herein, the term "reactive" means that the sulfur constituent is electrochemically effective to promote the corrosion of the oxidizable metal under atmospheric (oxygen and moisture) exposure conditions, e.g., atmospheric conditions of at least 5% relative humidity. Thus, the sulfur constituent is present in an oxidation-enhancing amount for the conductive metal, whereby the oxidation of the metal coating under oxygen and moisture exposure conditions takes place at a rate which is higher than would be the case in the absence of the sulfur constituent.

As used herein, the term "sulfur" is intended to be broadly construed to include sulfur, sulfur compounds, sulfur complexes, and any other forms of sulfur which are oxidation-enhancing in character, relative to the oxidizable metal.

The reactive sulfur constituent in the practice of the present invention is doped on and/or in the oxidizable conductive metal coating. As used herein, the term "doped" in reference to the reactive sulfur constituent means that the reactive sulfur constituent is dispersed in non-continuous form in and/or on the oxidizable metal coating. The loading or concentration of the sulfur constituent is appropriately less than 35% by weight of elemental sulfur, based on the weight of oxidizable metal in the oxidizable metal coating, and such reactive sulfur constituent is present in a non-protective amount and form for the oxidizable metal.

In the prior art, sulfur and sulfur additives, e.g., molybdenum sulfide, have been employed as an additive in metal coatings or in greases which are designed to reduce friction and wear of metal parts or metal coatings. In such prior art usage, the sulfur constituent is utilized in an amount and form which is protective of the metal with which it is employed, and this is a basic distinction from the practice of the present invention, wherein the reactive sulfur constituent is employed in an amount and form which is non-protective of the oxidizable metal coating against oxygen, moisture, wear, etc. The reactive sulfur constituent doped on and/or in the oxidizable metal coating in the present invention is provided in an amount and form which is effective to promote the corrosion of the oxidizable metal when the article is exposed to exposure conditions of oxygen and moisture, whereby the active sulfur constituent acts to enhance the corrosion of the oxidizable metal.

The concentration or loading of sulfur in the practice of the invention may be widely varied, within the above-noted constraint of not exceeding about 35% by weight of elemental sulfur, based on the total weight of oxidizable metal; preferably, the weight of the sulfur constituent is from about 0.01 to about 10% by weight, more preferably from about 0.02 to about 5% by weight, and most preferably from about 0.05 to about 2% by weight, based on the weight of oxidizable metal doped with the reactive sulfur constituent. The doping may be carried out in any suitable manner, as effective to disperse the sulfurizing constituent on and/or within the oxidizable metal coating. In a preferred aspect of the invention, the sulfurizing constituent is doped by exposure of the oxidizable metal coating to hydrogen sulfide gas, to thereby form sulfur-containing deposits on the surface of the oxidizable metal coating, e.g., in the form of discrete "patches" or "islands" of sulfur-containing material.

In this respect, it is to be noted that at sulfur doping concentration levels above about 35% by weight, based on the total weight of oxidizable metal, the concentration or "loading" of the sulfur constituent tends to become so large that the sulfur constituent becomes essentially continuous in and/or on the oxidizable metal coating, and tends to occlude or impede oxidation of the oxidizable metal coating, with result that corrosion is retarded rather than enhanced.

When promoter metals are employed to further enhance corrosion of the oxidizable metal coating, such promoter metals may comprise any suitable metals, such as cadmium, cobalt, nickel, tin, lead, copper, mercury, silver, and gold, with copper being preferred in the case of a conductive iron coating, due to its low toxicity, low cost, and low oxidation potential.

The salt doping referred to above may be carried out with any of various suitable salts including metal halide, metal sulfate, metal nitrate, and organic salts. Preferably the salt is a metal halide salt, whose halide constituent is chlorine. It is also permissible in the broad practice of the invention to provide such salt doping by exposure of the oxidizable metal to halogen gas to form the corresponding metal halide on the surface of the oxidizable metal film.

In chaff applications, wherein the chaff article includes a filamentous or other fine-diameter substrate element, the sulfurized oxidizable metal coating of the invention is characterized by a radar signature which in the presence of moisture, e.g., atmospheric humidity, decays as a result of progressive oxidation of the continuous metal coating, with the rate of such oxidation being accelerated by the sulfur constituent associated with the metal coating.

In a broad method aspect, the present invention relates to a method of forming an evanescently conductive coating on a non-conductive substrate, comprising:

(a) depositing on the substrate a sub-micron thickness of oxidizable metal, to form a conductive oxidizable metal coated substrate, wherein the oxidizable metal may suitably comprise a metal constituent selected from the group consisting of iron, nickel, copper, zinc, and tin, and combinations thereof; and (b) sulfurizing the oxidizable metal coating deposited on the substrate, as for example with doping of from about 0.01 to about 10% by weight sulfur, based on the weight of conductive oxidizable metal coated on the substrate.

In a further method aspect, the sulfurized, oxidizable metal-coated substrate formed as described above, may be further treated by applying thereto a promoter metal and/or salt, to further enhance the oxidation of the oxidizable metal coating on the substrate.

Other aspects and features of the invention will be more fully apparent from the ensuing disclosure and appended claims.

DETAILED DESCRIPTION OF THE INVENTION, AND PREFERRED EMBODIMENTS THEREOF

Figure 1:
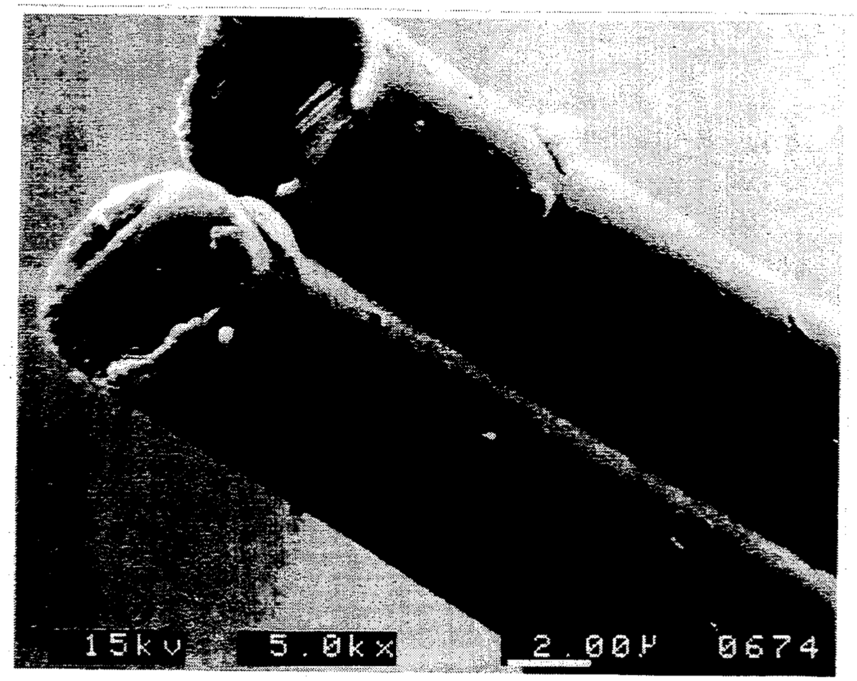
FIG. 1 is an electron photomicrograph, at magnification of 5000 times, of sulfurized iron-coated glass filaments.

The present invention relates broadly to an article comprising a non-conductive substrate having a continuous sub-micron thickness of a conductive oxidizable metal coating thereon, wherein the metal coating has been sulfurized by doping of the coating with an oxidization-enhancing amount of sulfur.

Preferably, the amount of sulfur dopingly associated with the oxidizable metal coating on the substrate is from about 0.01 to about 10% by weight of sulfur, based on the weight of oxidizable metal in the oxidizable metal coating on the non-conductive substrate. More preferably, the amount of sulfur dopingly associated with the oxidizable metal coating is from about 0.02 to about 5% by weight, and most preferably from about 0.05 to about 2.0% by weight, on the same oxidizable metal weight basis. As used in such quantitative ranges of concentration, the amount of sulfur refers to the amount of elemental sulfur. It is to be appreciated that the sulfur constituent doped on and/or within the oxidizable metal coating may take any of a wide variety of forms, including elemental sulfur, compounds of sulfur such as iron sulfide, hydrogen sulfide, and sulfur oxides, as well as any other sulfur-containing compositions which provide sulfur in a form which is electrochemically effective to enhance the rate and/or extent of corrosion of the oxidizable metal coating on the substrate.

The doped sulfur constituent is associated with the oxidizable metal coating on the substrate, e.g., within the oxidizable metal coating and/or on a surface of the oxidizable metal coating, and/or otherwise in sufficient proximity to the oxidizable metal coating to render the sulfur in the sulfur constituent enhancingly effective for the oxidation of the oxidizable metal coating. Preferably the doped sulfur constituent is associated with the oxidizable metal coating, by being present in the oxidizable metal coating itself and/or on a surface of the oxidizable metal coating. Although discussed primarily in the ensuing description in terms of chaff article applications, wherein the substrate element is preferably a fine-diameter filament, the utility of the present invention is not thus limited, but rather extends to any other applications in which a temporary conductive coating is desired on a substrate.

Examples of other illustrative applications include moisture sensors, corrosivity monitors, moisture barrier devices, and the like.

Accordingly, the substrate may have any composition and may take any form which is suitable to the manufacturing conditions and end use environment of the product article.

For chaff applications, it is preferred that the substrate be in filamentous (i.e., fiber) form, however, other substrate forms, such as microbeads, microballoons, hollow fibers, powders, flakes, ribbons, and the like, may be employed.

For applications other than chaff, it may be necessary or desirable to provide the substrate element in bulk physical form, or alternatively in a finely divided form, a filamentous form, or a particulate form, of the general types illustratively described above in connection with chaff articles according to the invention.

Irrespective of its physical form, the substrate element is non-conductive in character, and may be formed of any material which is appropriate to the processing conditions and end use applications of the product article. Illustrative substrate materials of construction include glass, polymeric, ceramic, pre-oxidized carbon and non-conductive carbon materials.

By "pre-oxidized carbon" is meant polyacrylonitrile fibers which have been heat-stabilized.

Among the foregoing classes of materials, glasses and ceramics are preferred in most instances where cost and weight considerations predominate. Oxide materials such as boria ($B_2O_3$) may be usefully employed in some applications. For chaff usage, boria has the advantage of being water soluble, whereby it can be dissipated by moisture.

Illustrative examples of potentially useful polymeric materials of construction for substrate elements include fibers of polyethylene, polyacrylonitrile, polyester, and polymeric materials commercially available under the trademarks Kevlar® and Kynol®.

In chaff applications, the density of the substrate element material of construction preferably is less than 2.9 grams per cubic centimeter, and most preferably is on the order of from about 1.3 to about 2.9 grams per cubic centimeter.

The most preferred materials of construction for chaff articles of the present invention are glasses, particularly oxide glasses, and more specifically silicate glasses. Silicate glasses have been advantageously employed in filamentous substrate elements in the practice of the present invention, and sodium silicate, borosilicate, calcium silicate, aluminosilicate, and aluminoborosilicate glasses may also be used to advantage. In general, the glasses useful for substrate elements in chaff applications have a density on the order of from about 2.3 to about 2.7 grams per cubic centimeter.

When filamentous glass substrate elements are employed to form chaff articles in accordance with the presence invention, the fiber diameter of the substrate element is on the order of from about 0.5 to 25 microns, and preferably on the order of from about 2 to about 15 microns. It is believed that if the fiber diameter is decreased substantially below about 3 microns, the coated chaff fibers tend to become respirable, with a corresponding adverse effect on the health, safety, and welfare of persons exposed to such chaff. If, on the other hand, the diameter of the glass chaff fiber is increased substantially above 12 microns, the fiber tends to exhibit poor hang times, dropping too rapidly for effective utilization. These size constraints are dictated by the character and properties of the substrate element material of construction. Lower density fibers may be successfully employed at larger diameters.

It will be appreciated that the specific size and dimensional characteristics, physical properties, and material of construction of the substrate element may be varied widely in the broad practice of the present invention, the specific choice of material, size, and properties thereof being readily determinable without undue experimentation by those skilled in the art, having regard to the specific end use application in which the coated substrate is to be employed.

Deposited on the substrate is a sub-micron thickness of an oxidizable conductive metal coating, of a metal selected from the group consisting of iron, nickel, copper, zinc, tin, and combinations (i.e., alloys, mixtures, eutectics, etc.) thereof. By "sub-micron thickness" is meant that the oxidizable metal coating has an applied thickness of less than 1.0 micron, consistent with the objective of the invention to provide a conductive coating on the substrate which is rapidly rendered non-conductive by oxidation thereof. Further, it has been found that at oxidizable metal coating thicknesses above about 1.0 micron, metal coated filaments in chaff applications tend to stick or adhere to one another, particularly when the chaff is provided in the form of multifilament tows, which typically may contain on the order of from about 200 to about 50,000 filaments per tow, and preferably contain from about 1,000 to about 12,000 filaments per tow. Additionally, it has been found that at oxidizable metal coating thicknesses significantly above 1.0 micron, differential thermal effects and/or deposition stresses tend to adversely affect the adhesion of the metal film to the substrate element, with consequent increase in the tendency of the metal film on the coated article to chip or otherwise decouple.

In chaff applications utilizing filamentous substrate elements, the oxidizable metal coating thickness may suitably be on the order of 0.002 to about 0.25 micron, with a thickness range of from about 0.025 to about 0.15 micron being generally preferred. Disproportionately lower film thicknesses of the oxidizable metal coating result in discontinuities which in turn adversely affect the desired conductivity characteristics of the applied oxidizable metal coating, such metal coating desirably being continuous in character. In chaff applications, the oxidizable metal preferably is iron, although other metal species such as nickel, copper, zinc, and tin may potentially advantageously be employed, as well as combinations of such metals.

To achieve the desired sub-micron thicknesses of the oxidizable metal coating on the substrate, it is preferred in practice to utilize chemical vapor deposition processes to deposit elemental metal on the substrate from an organometal precursor material for the oxidizable metal, although any other process techniques or methods which are suitable to deposit the oxidizable metal coating in a desired thickness (such as solution plating) may be usefully employed. When the preferred oxidizable metal iron is employed, the metal may be deposited by chemical vapor deposition utilizing an organoiron precursor material, such as iron carbonyls or ferrocene (bis(cyclopentadienyl)iron).

It will be recognized, however, that the specific substrate element material of construction must be selected to retain the substrate element's desired end-use characteristics during the oxidizable metal coating operation, as well as during the subsequent treatment steps. Accordingly, when chemical vapor deposition is employed to deposit an oxidizable metal, e.g., iron, on the substrate, temperatures in the range of 90° C.–800° C. can be involved in respective steps of the coating process. Oxidizable metal application temperatures are dictated by the thermal carrying properties and thermal stability of the substrate. Thus, these properties of the substrate can determine the properties of the deposited film. Accordingly, a substrate material accommodating a range of processing temperatures is preferred, e.g., glass or ceramic.

As an example of the utilization of chemical vapor deposition to deposit an elemental iron coating on a substrate material, the substrate element may be a silicate glass fiber with a diameter on the order of 3–8 microns. Such fibers may be processed in a multizone chemical vapor deposition (CVD) system including a first stage in which the substrate filament is desized to remove epoxy or starch size coatings, at a temperature which may be on the order of 650° C.–800° C. and under an inert or oxidizing atmosphere. Following desizing, the clean filament may be conducted at a temperature of 450° C.–600° C. into a coating chamber of the CVD system. In the coating chamber, the hot filament is exposed to an organoiron precursor gas mixture, which in the case of the preferred oxidizable metal species, iron, may comprise iron pentacarbonyl as the iron precursor compound, at a concentration of 5–50% by weight in a carrier gas such as hydrogen. This source gas mixture may be at a temperature on the order of 75° C.–150° C. in the coating chamber, whereby elemental iron is deposited on the substrate element from the carbonyl precursor compound. The coating operation may be carried out with a series of successive heating and coating steps, to achieve a desired film thickness of the applied iron coating.

It will be appreciated that the foregoing description of coating of the non-conductive substrate with iron is intended to be illustrative only, and that in the broad practice of the present invention, other CVD iron precursor compound gas mixtures may be employed, e.g., ferrocene in a hydrogen carrier gas. Alternatively, other non-CVD techniques may be employed for depositing the oxidizable metal on the substrate, such as solution plating of iron or other suitable oxidizable metal species.

In the broad practice of the present invention, the oxidizable coating formed on the non-conductive substrate is dopingly sulfurized, to associated sulfur therewith, before, during, and/or after the application of the oxidizable metal coating to the substrate. For example, a sulfur-containing material may be applied to the substrate prior to application of the oxidizable metal coating thereon, or the sulfur constituent may be co-deposited with the oxidizable metal coating, or serially applied between successive applications of oxidizable metal film to yield the final oxidizable metal coating, or the sulfur constituent may be applied to an external surface of the applied oxidizable metal coating, or by any combinations of such steps, or selected ones thereof, with or without other steps, for doping the oxidizable metal with sulfur.

As indicated hereinabove, it is generally preferred to deposit the oxidizable metal coating on the substrate material by chemical vapor deposition techniques, when the substrate element is glass or ceramic, utilizing an organometallic precursor compound as a source material for the deposited oxidizable metal. The chemical vapor deposition process may involve repetition of successive heating and coating steps for deposition of the oxidizable metal film at a desired thickness, and in such case it generally is preferred to deposit the reactive sulfur constituent in the heating zones between successive coating zones of the process system.

In such system, the sulfur-containing material may be introduced in the heating zone(s) to deposit a reactive sulfur constituent on the substrate, with the deposited sulfur constituent then being overlaid with a film of applied oxidizable metal coating in the next succeeding oxidizable metal coating zone. In this manner, the sulfur material may be deposited on an initial and succeeding films of applied oxidizable metal which in the aggregate make up the oxidizable metal coating on the substrate.

For ease of description in the ensuing discussion, each constituent application of oxidizable metal to a substrate in a multi-zone metal coating process system will be referred to as a "pass", so that for example a "five-pass system" entails five discrete applications of oxidizable metal coating. In such five-pass system, sulfur-containing material may be applied to the oxidizable metal film after the first pass and or any succeeding pass(es) including the final pass.

Although any suitable application scheme for associating sulfur constituent(s) with the oxidizable metal coating may be employed in a multi-pass system, it generally is desirable to apply the doped sulfur constituent(s) to the oxidizable metal coating in at least the outer portion of the applied oxidizable metal film, so that sulfur availability in the outer portion of the film is provided for, consistent with the objective of enhancing the corrosion rate of the oxidizable metal film with a sulfur constituent. Typically it is preferred not to deposit the sulfur constituent in an initial filament desizing step, but rather in at least some of the subsequent preheating zones upstream of the corresponding chemical vapor deposition reaction chambers.

In the preheat zone(s), sulfur may for example be introduced in the form of a sulfur compound such as hydrogen sulfide, in a carrier gas such as nitrogen or hydrogen. When hydrogen sulfide is used as the sulfur-containing material for deposition, it generally is suitable to operate the coating process system with a concentration of from about 0.01 to about 20% by weight, based on the total weight of hydrogen sulfide and carrier gas, of hydrogen sulfide in the carrier gas. For example, a 10% by weight hydrogen sulfide in hydrogen carrier gas mixture has been used to good advantage.

The heating zone during the deposition of the sulfur material may be maintained at a temperature in the range of from about 450° C. to about 600° C. for the aforementioned hydrogen sulfide/carrier gas mixture, although the specific temperatures, sulfur-containing material, and other process conditions may be widely varied depending on the nature of the application system and the desired final product article.

Generally, hydrogen is preferred as a carried species for the sulfur-containing material, since hydrogen aids in reducing the previously applied oxidizable metal coating, and opposing the oxidation thereof. Hydrogen sulfide is a preferred sulfur-containing material for use in the aforementioned illustrative chemical vapor deposition system, and when employed in hydrogen carrier gas, results in the formation of doped metal sulfide in the previously applied oxidizable metal film, along with the formation of doped inclusions of hydrogen sulfide, sulfur oxide, and elemental sulfur, in the resulting sulfurized coating of oxidizable metal.

It will be appreciated that the doping method of associating the sulfur material with the oxidizable metal coating may be carried out in a wide variety of methods, and with a wide variety of suitable sulfur-containing materials. For example, it maybe advantageous in some applications to sulfurize the oxidizable metal coating by application thereto of a coating of a solvent solution of a suitable sulfur-containing material. As an illustration, it may be desirable in some instances to coat the oxidizable metal coating with a solvent solution of a sulfur-containing compound, such as thiophene, whereby subsequent drying of the solution coating will yield the sulfur-containing compound on the oxidizable metal coating.

The present invention is based on the substantial and unexpected discovery that very low quantities of sulfur may be associated with an oxidizable metal coating on a non-conductive substrate, to markedly increase the rate of corrosion of the oxidizable metal coating on the substrate element, so that the conductive oxidizable metal coating is oxidatively converted to non-conductive metal oxide.

Further, the enhancement of the corrosion reaction involving the oxidizable metal coating has been found to take place at an accelerated rate when the oxidizable metal coating is sulfurized, even at relatively low humidity exposure conditions, e.g., 11% relative humidity. Thus, the sulfur functions to reduce the amount of atmospheric moisture (water) otherwise required to oxidize the oxidizable metal coating to the corresponding metal oxide reaction product.

The specific loading of sulfur associated with the oxidizable metal coating in the article of the present invention may be readily determined by those skilled in the art without undue experimentation, by the simple expedient of varying the doped sulfur loading and/or metal oxidization (corrosion) conditions, to determine the sulfur loading which is necessary or desirable in a given end use application.

As an example of the oxidation characteristics of articles of the present invention, it has been found that sulfurization of an iron coating in a chemical vapor deposition process system, of the type previously illustratively described, to provide a 0.1% by weight loading of sulfur in an iron coating of 0.075 micron thickness on a 4.8 micron diameter glass filament, will yield a substantially complete oxidation of the iron coating after about 10 hours at 98% relative humidity exposure conditions.

It will likewise be appreciated that it is feasible in the broad practice of the present invention to selectively vary the sulfur loading associated with the oxidizable metal coating, to achieve a predetermined corrosion rate and service life of the conductive oxidizable metal coating, in chaff or other oxidizable metal coating conductivity dissipation applications.

Subsequent to application to the substrate of the oxidizable metal coating of the desired thickness, and sulfurization thereof, the oxidizable metal-coated substrate may optionally be coated or doped with a discontinuous coating of a "promoter metal" which is galvanically effective to promote the corrosion of the oxidizable metal, on the external surface of the oxidizable metal coating. The promoter metal coating is discontinuous in character, in that the promoter metal coating does not fully cover or occlude the oxidizable metal coating on the non-conductive substrate. As a result of the exposure of the oxidizable metal coating "through" the discontinuous promoter metal coating to the ambient environment, the conductive oxidizable metal coating is converted by atmospheric moisture to a non-conductive metal oxide film, wherein the corrosion rate of the oxidizable metal film is enhanced both by the sulfur constituent and the promoter metal.

Thus, such oxidation or corrosion of the oxidizable metal film is galvanically assisted and accelerated by the discontinuous coating of promoter metal which is superposed on the sulfurized oxidizable metal coating.

The promoter metal discontinuously coated on the oxidizable metal coating as described above may include any suitable metal which is galvanically effective to promote the corrosion of the oxidizable metal. As used in such context, the term "promoter metal" is to be broadly construed to include elemental metal, as well as alloys, intermetallics, composites, or other materials containing a corrosion promotingly-effective metal constituent.

In order for a metal to be promotingly-effective of the corrosion of the oxidizable metal film, and assist in the oxidation of the oxidizable metal, the promoter metal must have a lower standard oxidation potential than the elemental oxidizable metal constituent, thereby enabling the promoter metal to act as a cathodic constituent in the galvanic corrosion reaction. Illustrative of elemental promoter metals which may be potentially usefully employed in the broad practice of the present invention are cadmium, cobalt, nickel, tin, lead, copper, mercury, silver, and gold. In general, the lower the oxidation potential, $E^{O}$, the faster is the reduction-oxidation corrosion reaction.

Of the above-listed exemplary elemental metals useful in the broad practice of the present invention, and with preference to iron as the oxidizable conductive metal coating, copper is typically a preferred elemental metal, due to its low toxicity, low cost, and low oxidation potential.

The application or formation of the discontinuous coating of promoter metal on the sulfurized oxidizable metal coating may be carried out in any suitable manner, such as flame spraying, low rate precipitation in plating bath, or other surface application methods. It is also within the broad purview of the present invention to provide a continuous film of the promoter metal on the oxidizable metal coating, and to thereafter preferentially etch or attack the continuous promoter metal film to render same discontinuous in character. Further, it is possible to form the discontinuous promoter metal film on the oxidizable metal coating film by in situ chemical reaction, wherein the reaction product comprises a promoter metal species which is effective to galvanically accelerate the corrosion of the oxidizable metal coating under ambient exposure conditions in the presence of atmospheric moisture.

In general, however, it is preferred to achieve a discontinuous deposition of the promoter metal on the oxidizable metal-coated substrate by chemical vapor deposition techniques, utilizing as the precursor material for the promoter metal an organometal compound whose metallic moiety is the promoter metal. In order to form the discontinuous promoter metal coating, the concentration of the organometal precursor in the gas stream introduced to the chemical vapor deposition chamber should be suitably low. The specific concentrations and process conditions which are suitable to form discontinuous promoter metal films from a given organometal precursor material will be readily determinable by those of ordinary skill in the art, without undue experimentation.

As indicated, for iron-coated substrates, copper typically is a most preferred promoter metal species. Tin is also preferred and, to a lesser extent, nickel, although nickel may be unsatisfactory in some applications due to toxicity considerations, depending on the ultimate end use.

For the aforementioned most preferred copper promoter metal species, application of the discontinuous coating of copper to the oxidizable metal-coated substrate by chemical vapor deposition techniques may utilize copper hexafluoroacetylacetonate as an organocopper precursor compound for elemental copper deposition. In the chemical vapor deposition process, the gas-phase concentration of this organocopper precursor compound is maintained at a suitably low level, e.g., not exceeding about 200 grams per cubic centimeter of the vapor (carrier gas and volatile organometal precursor compound), and typically much lower, such as for example 0.001 gram per cc. By maintaining the vapor-phase concentration of the promoter metal precursor compound suitably low, the discontinuous coating of the promoter metal is achieved. For example, at the aforementioned concentration of 0.001 gram of copper hexafluoroacetylacetonate per cubic centimeter of vapor mixture in the chemical vapor deposition chamber, it is possible to form localized discrete deposits, e.g., "islands," of the promoter metal derived from the organometal precursor compound.

The choice of a specific organometallic precursor compound for the promoter metal may be suitably varied, depending on the chemical vapor deposition process conditions, metal constituent, character of the oxidizable metal-coated substrate, etc., as will be apparent of those skilled in the art. In the case of tin as the promoter metal, a suitable organometallic precursor compound is tetramethyl tin.

As a further optional treatment of the sulfurized oxidizable metal-coated substrate, which may be employed with or without the aforementioned optional application of a promoter metal, the sulfurized oxidizable metal-coated substrate may be further coated or doped with a suitable amount, for example from about 0.005 to about 25% by weight, based on the weight of oxidizable metal in the oxidizable metal coating, of a salt, e.g., a metal salt or organic salt, on the external surface of the oxidizable metal coating by exposure of the coating to a halogen, e.g., chlorine, gas, to form the corresponding metal halide. The salt may include as potentially useful salt species metal salts (e.g., halides, nitrides, sulfates, etc.) as well as organic salts (e.g., citrates, stearates, acetates, etc.), the choice of a specific salt being readily determinable by simple corrosion tests without undue experimentation. It will likewise be appreciated that the type and amount, or "loading," of the salt may be widely varied as necessary or desirable to correlatively provide a predetermined service life for the oxidizable metal under corrosion conditions in the specific end-use environment in which the product article is to be employed.

Since it is desired that the oxidizable metal coating be retained in an oxidizable state, the oxidizable metal-coated substrate suitably is processed during the oxidizable metal deposition, sulfurization, optional promoter metal application, optional salt application or formation, and any succeeding treatment steps, under an inert or other non-oxidizing atmosphere.

The optional salt coating of the sulfurized oxidizable metal-coated substrate advantageously may be carried out by passage of the sulfurized oxidizable metal-coated substrate through a bath containing a solution of the salt, or in any other suitable manner, effecting the application of the salt to the external surface of the sulfurized oxidizable metal coating. Generally, however, solution bath application of the salt is preferred, and for such purpose the bath may contain a low concentration solution of salt in any suitable solvent. Preferably, the solvent is anhydrous in character, to minimize premature oxidation of the oxidizable metal coating. Alkanolic solvents are generally suitable, such as methanol, ethanol, and propanol, and such solvents are, as indicated, preferably anhydrous in character. The salt may be present in the solution at any suitable concentration, however it generally is satisfactory to utilize a maximum of about 25% by weight of the salt, based on the total weight of the salt solution.

In the preferred salt solution formation of a salt coating on the oxidizable metal surface, any suitable salt may be employed in the salt solution bath, although metal halide salts and metal sulfate salts are preferred. Among metal halide salts, the halogen constituent preferably is chlorine, although other halogen species may be utilized to advantage. Examples of suitable metal halide salts include lithium chloride, sodium chloride, zinc chloride, and iron (III) chloride. A preferred metal sulfate species is copper sulfate, $CuSO_4$. Broadly, from about 0.005% to about 25% by weight of salt, based on the weight of oxidizable metal in the oxidizable metal coating, may be applied to the oxidizable metal coating, with from about 0.05% to 20% by weight being preferred, and from about 0.1% to about 15% by weight being most preferred (all percentages of salt being based on the weight of oxidizable metal in the oxidizable metal coating on the substrate element).

Among the aforementioned illustrative metal chlorides, iron (III) chloride is a preferred salt. It is highly hygroscopic in character, binding six molecules of water for each molecule of iron chloride in its most stable form. Iron (III) chloride has the further advantage that it adds Fe (III) to the metal-coated fiber to facilitate the ionization of the oxidizable metal. For example, in the case of iron as the oxidizable metal on the non-metallic substrate, the presence of Fe (III) facilitates the ionization of Fe (O) to Fe (II). Additionally, iron (III) chloride is non-toxic in character. Copper sulfate is also a preferred salt dopant material since the copper cation functions to galvanically facilitate the ionization of iron, enhancing the rate of dissolution of the iron film, when iron, the preferred oxidizable metal, is employed in the metal coating on the non-metallic substrate.

When the salt dopant is applied from a solution bath, or otherwise from a salt solution, the coated substrate after salt solution coating is dried, such as by passage through a drying oven, to remove solvent from the applied salt solution coating, and yield a dried salt coating on the exterior surface of the sulfurized oxidizable metal coating. The temperature and drying time employed in the solvent removal operation may be readily determined by those skilled in the art without undue experimentation, as appropriate to yield a dry salt coating on the sulfurized oxidizable metal-coated substrate article. When alkanolic solvents are employed, the drying temperature generally may be on the order of about 100° C.

After salt coating of the sulfurized oxidizable metal-coated substrate, and drying to effect solvent removal from the applied salt coating when the salt is applied from a solvent solution, the resulting salt-doped, sulfur-doped, oxidizable metal substrate product article is hermetically sealed for subsequent use.

It is to be recognized that salt coating or promoter metal coating of the sulfurized oxidizable metal-coated substrate is not required in the broad practice of the present invention, but represent optional additional coating treatments which may be carried out to further enhance the oxidization of the oxidizable metal film on the substrate during the accelerated corrosion of the oxidizable metal coating resulting from the presence of sulfur in association therewith.

As indicated, during the processing of the substrate by application of the oxidizable metal-coating thereto, and sulfurization of such oxidizable metal coating, the coated article is processed under an inert or otherwise non-oxidizing atmosphere to preserve the oxidizable character of the oxidizable metal film. Thus, the coating, sulfurization, and optional promoter metal and/or salt doping and packaging steps may be carried out under a non-oxidizing atmosphere such as nitrogen. In the final packaging step the sulfurized oxidizable metal-coated substrate may be disposed in a package, chamber, housing, or other end use containment means, for storage pending use thereof, with a non-oxidizing environment being provided in such containment means. Thus, final product article may be stored in the containment means under nitrogen, hydrogen, or other non-oxidizing atmosphere, or in a vacuum, or otherwise in an environment substantially devoid of oxygen or other oxidizing species of constituents which may degrade the oxidizable metal coating or otherwise adversely affect its utility for its intended end use.

Depending on the type and character of the substrate element, it may be desirable to treat the substrate article in order to enhance the adhesion thereto of the oxidizable metal coating. For example, as described above concerning the usage of glass filament as the substrate element, it may be necessary or desirable to desize the glass filament when same is initially provided with a size or other protective coating, such as an epoxy, silane, or amine size coating, by heat treatment of the filament. More generally, it may be desirable to chemically or thermally etch the substrate surface, such as by acid exposure or flame spray treatment. It may also be desirable to employ a primer or adhesion promoter coating or other interlayer on the substrate to facilitate or enhance the adhesion of the oxidizable metal coating to the substrate. Specifically, it may be desirable formed of materials such as glasses, ceramics, or hydroxy-functionalized materials, to form an interlayer on the substrate surface comprising a material such as polysilicate, titania, and/or alumina, using a sol gel application technique, as is disclosed and claimed in U.S. Pat. No. 4,738,896 issued Apr. 19, 1988 to W. C. Stevens for "SOL GEL FORMATION OF POLYSILICATE, TITANIA, AND ALUMINA INTERLAYERS FOR ENHANCED ADHESION OF METAL FILMS AND SUBSTRATES," the disclosure of which hereby is incorporated herein by reference.

It may also be necessary or desirable in the broad practice of the present invention to treat or process the oxidizable metal-coated substrate to enhance the adhesion of the discontinuous coating of the promoter metal to the oxidizable metal coating on the substrate.

Referring now to the drawings, FIG. 1 is an electron photomicrograph, at a magnification of 5000 times, of sulfur-doped, iron-coated glass filaments. Each of the coated filaments comprises an oxidizable iron coating on the exterior surface of the substrate glass filament, with the iron coating having been sulfurized by hydrogen sulfide contacting between successive depositions of iron in a multizone heating/coating chemical vapor deposition system.

The scale of the electron photomicrograph in FIG. 1 is shown by the line in the right central portion at the bottom of the photograph, representing a distance of two microns.

The glass filaments employed in the coated fibers shown in FIG. 1 were of lime aluminoborosilicate composition, commercially available as E-glass (Owens-Corning D filament) (54% $SiO_2$; 14.0% $Al_2O_3$; 10.0% $B_2O_3$; 4.5% MgO, and 17.5% CaO) having a measured diameter of 4.8 microns, and were coated with an iron coating of 0.075 micron thickness. The iron coating contained about 0.1% by weight sulfur (measured as elemental sulfur), based on the weight of iron in the oxidizable iron coating on the substrate.

Figure 2:
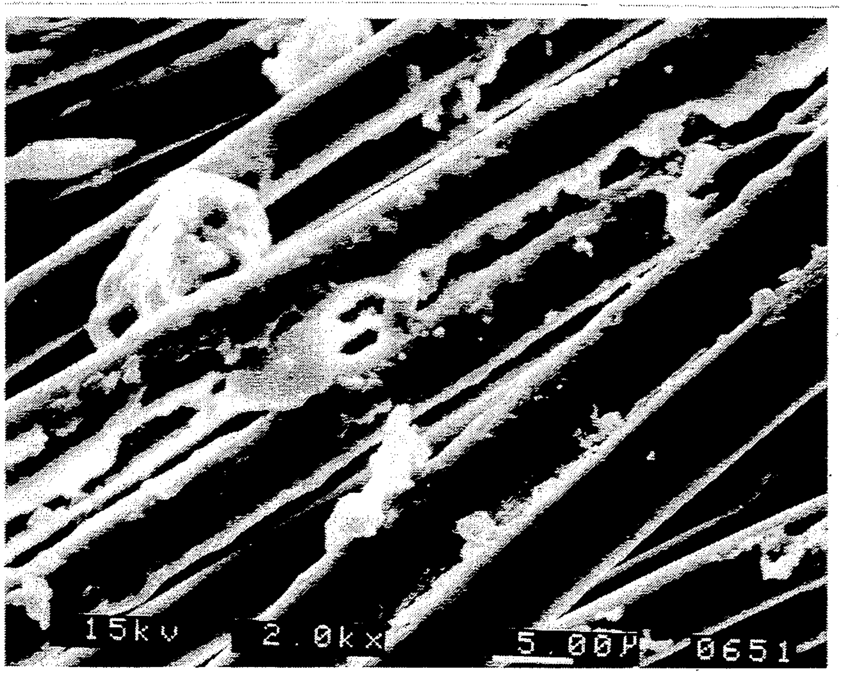
FIG. 2 is a photomicrograph, at magnification of 2000 times, of a tow of sulfurized iron-coated glass filaments, as oxidized after 500 hours exposure at 35° C. and 11% relative humidity conditions.

FIG. 2 shows the corrosion product of a tow of sulfurized iron-coated glass filaments of the type shown in FIG. 1, after 500 hours exposure at 35° C. and 11% relative humidity conditions. As shown, the corrosion of the fibers is substantial. The magnification of the photomicrograph of FIG. 2 is 2000 times, with the scale of the photograph being shown by the line in the right-hand central region of the photograph, at the bottom thereof, representing a distance of 5 microns.

Figure 3:
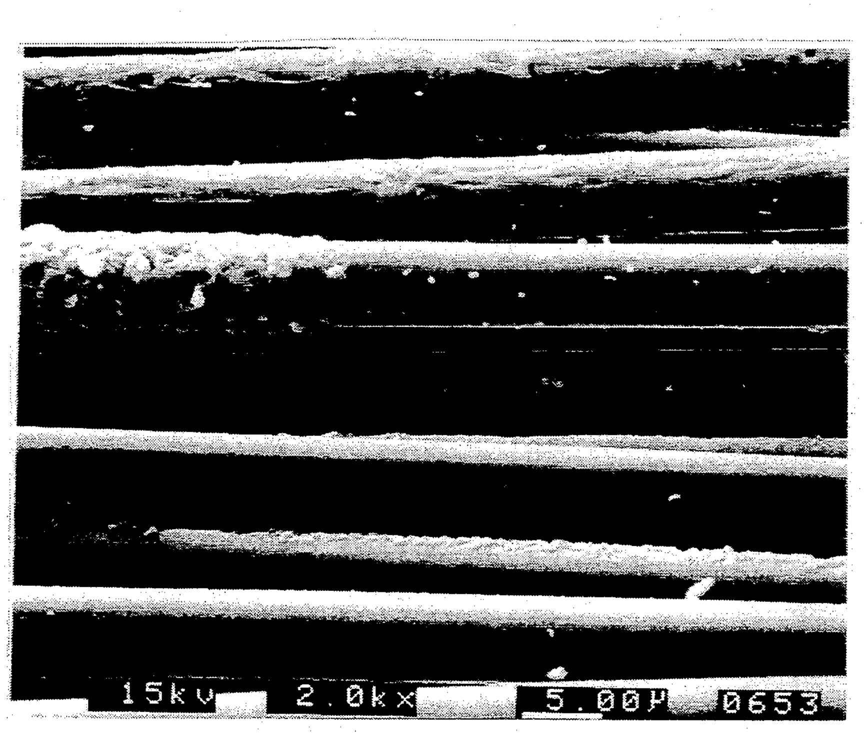
FIG. 3 is an electron photomicrograph, at magnification of 2000 times of a tow of iron-coated glass filaments similar to the tow shown in FIG. 2, but not subjected to sulfurization treatment, after 500 hours exposure at 35° C. and 11% relative humidity.

FIG. 3 is a photomicrograph, at the same magnification as FIG. 2, of a tow of fibers corresponding to those of FIG. 2, but in which the iron coatings were not sulfurized, after 500 hours exposure at 35° C. to 11% relative humidity conditions. As shown, the FIG. 3 tow of fibers exhibited relatively negligible corrosion after the same exposure which produced a high degree of corrosion in the tow of sulfur-doped, iron-coated glass filaments shown in FIG. 2. These respective photographs clearly show the advantages of the sulfur-doping treatment of the oxidizable metal coating in the articles of the present invention, with respect to corrosion of the oxidizable metal coating on the substrate.

Figure 4:
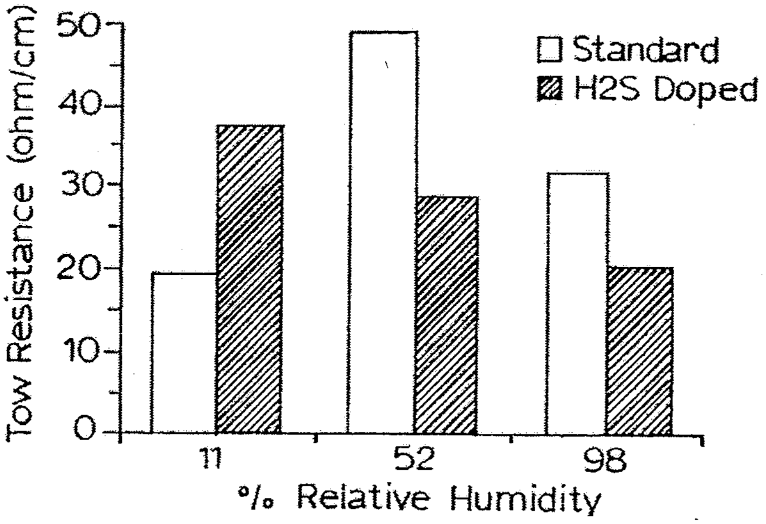
FIG. 4 is a graph of tow resistance, in ohms/cm., as a function of relative humidity at 11%, 52%, and 98% relative humidity exposure values, for iron-coated glass filaments devoid of any sulfurization ("STANDARD") and for a tow of corresponding sulfurized iron-coated glass fibers "("H2S DOPED")".

FIG. 4 is a graph of tow resistance, in ohms/cm., as a function of percent relative humidity for respective fiber tows of the type shown in FIGS. 2 and 3, respectively. The tows comprising sulfurized iron-coated glass filaments ("STANDARD") are identified in the graph by solid bars, and the corresponding sulfurized iron-coated filament tows ("H2S DOPED") are denoted by the diagonally striated bars.

The data in FIG. 4 show that the sulfurization of the iron coating on the tow filaments lowered initial conductivity at low relative humidity conditions, relative to the corresponding unsulfurized filament tows, while at higher humidity conditions, the tow resistance was less than that of the corresponding unsulfurized filament tows. The sulfur-doping process appears to have evened out the effect of relative humidity upon initial conductivity.

When the filament tows comprising sulfurized iron coatings which provided the initial conductivity data of FIG. 4 where exposed overnight to ambient atmospheric conditions, the metal coatings became very discolored as rust, and subsequent testing of conductivity showed nearly full decay of current-carrying properties.

Figure 5:
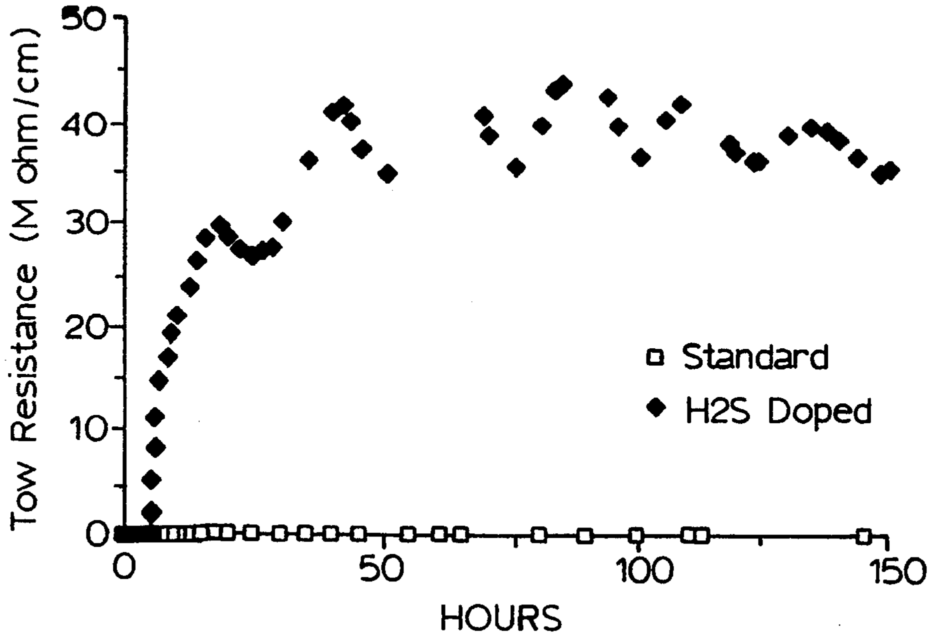
FIG. 5 is a graph of tow resistance, in Megaohms/cm., as a function of exposure time, in hours, for a tow of iron-coated glass fibers devoid of any sulfurization ("STANDARD") and a corresponding tow of sulfurized iron-coated glass fibers ("H2S Doped"), at 25° C. and 98% relative humidity exposure conditions.

FIG. 5 is a graph of resistance, in Megaohms/cm., as a function of exposure time, in hours, for fiber tows which comprised approximately 4.8 micron diameter glass filaments as the substrate elements, on which were coated 0.075 micron thicknesses of iron. One tow was sulfurized by exposure to hydrogen sulfide ("H2S Doped") and the other was retained in an unsulfurized condition ("STANDARD").

In order to measure the tow resistance of the respective fiber tows, each tow was mounted on a copper contact circuit board with a known spacing in either a two-point or four-point arrangement. Electrical contact was assured through use of conductive silver paint. Fiber tows were analyzed by use of a digital multimeter. A known voltage was applied across the fiber circuit. The resulting current was metered and the resistance computed. This measurement was repeated periodically over the fiber lifetime of interest, with voltage being applied during each interval for a duration just long enough to allow measurement to be made.

The resistance of each of the respective fiber tows for which data is shown in FIG. 5 was measured as a function of time of exposure to 98% relative humidity conditions, at 25° C. As shown in the graph, the control tow, comprising fibers devoid of any sulfur content, exhibited a constant resistance over an exposure time of approximately 115 hours. The second tow, which comprised sulfurized iron-coated filaments, showed a rapid increase in resistance beginning at about 8 hours of cumulative exposure, indicating that the oxidizable iron coating on the glass filaments in the tow were being rapidly oxidized, with the conductive iron coating being transformed to non-conductive iron oxide.

Figure 6:
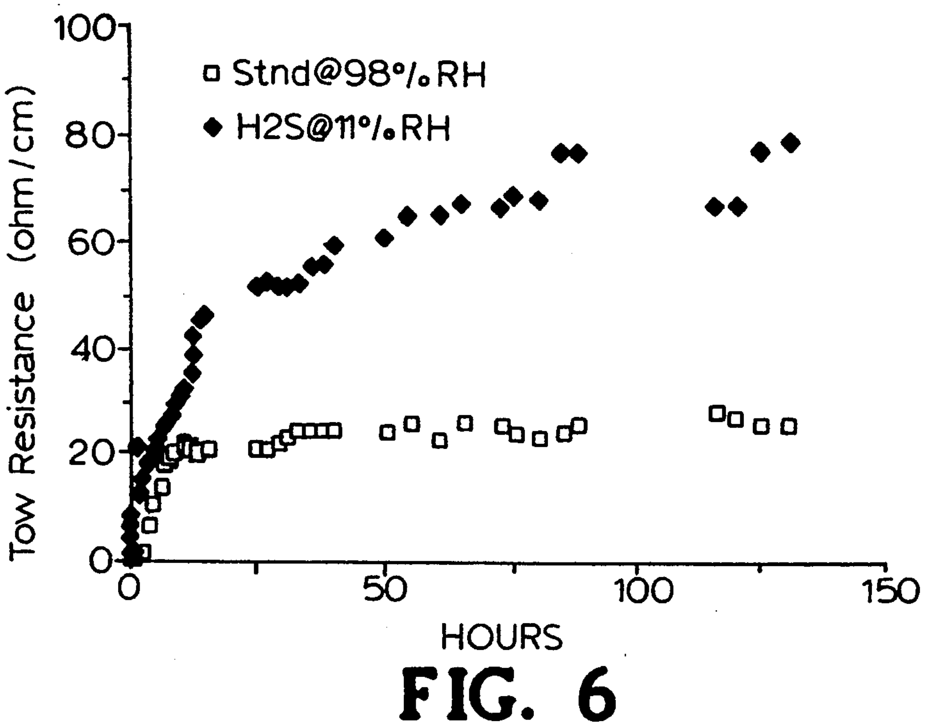
FIG. 6 is a chart of change in tow resistance over a ten hour exposure time for a tow of iron-coated glass fibers ("H2S") and a corresponding tow of sulfurized iron-coated glass fibers ("STND") as a function of relative humidity and exposure temperature.

FIG. 6 is a chart again comparing an iron-coated glass fiber tow devoid of sulfur ("STND") with a corresponding sulfurized tow ("H2S"). The percentage of change in resistance over an initial 10 hours of exposure is plotted (as an indicator of corrosion rate) as a function of temperature and humidity. The standard non-sulfurized material represented by solid and cross hatched patterns exhibits a strong dependence upon temperature and humidity of exposure. The sulfurized sample represented by the diagonal pattern shows a more even response across the conditions tested along with a dramatic enhancement of corrosion rate.

Thus, the life of the conductive oxidizable metal coating may be controllably adjusted by selectively varying the sulfurization of the conductive oxidizable metal coating, and optionally by selectively coating a promoter metal and/or providing a salt on the surface of the sulfurized oxidizable metal coating. In chaff applications, such selective sulfurization and optional salt/promoter metal coating of the oxidizable metal coating may be utilized to correspondingly adjust the service life of the oxidizable metal-coated chaff fibers, consistent with a desired retention of the initial radar signature characteristic thereof for a given length of time, followed by rapid dissipation of the radar signature of such "evanescent chaff" material.

In some instances in which the sulfur-doped oxidizable metal-coated substrate is subjected to contact with other coated articles, or otherwise to abrasion prior to actual deployment, it may be desirable to overcoat the sulfur-doped oxidizable metal-coated substrate, particularly if a salt coating and/or promoter metal coating is/are employed, to prevent damage to the coated article as a result of abrasion or other contacts. For example, a porous gel coating or binder material may be applied to the coated substrate article for the purpose of preventing such damage. The overcoat may generally be of any suitable material which does not adversely affect the coating(s) on the substrate element, relative to the intended purpose of the coated product article. A preferred overcoat material comprises polysilicate, titanium and/or aluminum, formed on the coated substrate element from a sol gel dispersion of polysilicate, titania, and/or aluminum material, as more fully disclosed and claimed in U.S. Pat. No. 5,087,515 issued Feb. 11, 1992, the disclosure of which is hereby incorporated herein by reference.

As used herein, the term "oxidizable metal" is intended to be broadly construed to include elemental metals per se, and combinations of elemental metals with each other and/or with other materials, and including any and all metals, alloys, eutectics, and intermetallic materials containing one or more elemental metals, and which are depositable in sub-micron thicknesses on the substrate and subsequent to such deposition are oxidizable in character.

Although iron is a preferred oxidizable material in the practice of the present invention, and the invention has been primarily described herein with reference to iron-coated glass filaments, it will be recognized that nickel, copper, zinc, and tin, as well as other metals, may be potentially usefully employed in similar fashion. It will also be recognized that the substrate element may be widely varied, to comprise the use of other substrate element conformations and materials of construction.

The features and advantages of the present invention are more fully shown with reference to the following non-limiting examples, wherein all parts and percentages are by weight, unless otherwise expressly stated.

EXAMPLE I

A calcium aluminoborosilicate fiberglass roving material (E-glass, Owens Corning D filament), comprising glass filaments having a measured diameter of approximately 4.8 microns and a density of approximately 2.6 grams per cubic centimeter, was desized under nitrogen atmosphere to remove the size coating therefrom, at a temperature of approximately 700° C. Following desizing, the filament roving at a temperature of approximately 500° C. was passed through a chemical vapor deposition chamber maintained at a temperature of 110° C. The chemical vapor deposition chamber contained 10% iron pentacarbonyl in a hydrogen carrier gas. The fiber roving was passed through heating and coating deposition zones in sequence, comprising five coating deposition zones, to deposit a coating of elemental iron of approximately 0.075 micron thickness on the fiber substrate of the roving filaments.

In the heating zone upstream of the second and succeeding chemical vapor deposition coating zones in the process system, the fiber coated with iron film in the preceding coating chamber was exposed to 10% hydrogen sulfide in hydrogen carrier gas mixture (the percentage being based on the total weight of hydrogen sulfide and hydrogen), at a temperature of 450° C.–600° C., to reduce the previously applied iron film and incorporate sulfur-containing material in the film. As a result, the sulfur loading of the oxidizable iron film was about 0.1% by weight sulfur (measured as elemental sulfur), based on the weight of elemental iron in the oxidizable iron coating on the glass filament substrate.

EXAMPLE II

The sulfurized iron-coated filament roving of Example I was passed through a chemical vapor deposition chamber to which a gas stream of approximately 50% to 80% by weight copper hexafluoroacetyl acetonate in carrier gas was supplied, resulting in deposition of copper islands whose dimensional size characteristics, as measured along the surface of the iron coating, were in the range of from about 0.5 to about 10 microns. The resulting copper-coated, sulfur-doped, iron-coated roving then was packaged under nitrogen atmosphere in a moisture-proof package.

EXAMPLE III

In this Example, an oxidizable iron coating was applied to a glass filament roving material, which was sulfurized during the iron coating process, and then coated with a discontinuous coating of copper, as described in Example II. Subsequent to the formation of deposited copper islands on the iron coating, the roving was passed through a solution bath containing 2% by weight of iron (III) chloride in methanol solution, under nitrogen atmosphere. The roving then was passed through a drying over at a temperature of approximately 100° C. under nitrogen atmosphere, to remove the methanol solvent and leave a salt coating of iron (III) chloride on the copper-coated, sulfurized iron-coated substrate. The salt-doped, copper-coated, sulfurized iron-coated roving then was packaged under nitrogen atmosphere in a moisture-proof package.

EXAMPLE IV

Sulfur-doped, iron-coated glass fibers, and sulfur-doped, salt-doped, iron-coated glass fibers in accordance with the present invention were prepared by chemical vapor deposition of iron coatings followed by treatment with hydrogen sulfide, or by salt doping followed by treatment with hydrogen sulfide, and were compared with prior art sulfur-treated iron-coated glass fibers, in respect of their physical and electrical properties. The prior art coated fibers were prepared with sulfide or oxide coatings by the methods of Budd U.S. Pat. No. 2,930,105, Stalego U.S. Pat. No. 3,372,051, and Whitehurst U.S. Pat. No. 2,920,981.

The experimental details of this comparison study are set out below.

Iron Coating and Glass Fibers

A bundle of 20×408-count Owens Corning D tows was desized by passing through an oven in air at 650° C. The fibers were pre-heated to 475° C. and passed into a chamber held at 80° C., where they were exposed to iron pentacarbonyl vapors introduced in a $H_2/N_2$ stream. The fibers were carried into a second chamber where they were heated by infrared to further decompose the iron pentacarbonyl. The outside temperature of that glass-walled container was about 60° C.

Sulfurizing the Iron-coated Glass Fibers

After the fibers exited the infrared chamber, they were brought into a chamber held at 250° C. and exposed to a 10% $H_2S$/90% $H_2$ mixture. Variations in sulfurizing gas concentration, locale of sulfurizing in the coating process, and processing temperature of fiber during or after sulfurizing can affect the extent of sulfur doping.

Salt-doping the Iron-coated Glass Fibers

Fibers were passed through a saturated solution of iron (III) chloride hexahydrate in ethanol and dried in a stream of nitrogen.

Applying Prior Art Lubricious Coatings to the Iron-coated Glass Fibers

The prior art lubricious coatings were applied to the coated fibers by dipping or spraying followed by a wipe-off to remove excess lubricant. The brand names and manufacturers of these lubricants were as follows:

| Lubricant | Manufacturer |
|---|---|
| Elmers Slide-All ® No. E450 | Borden, Inc. |
| Never-Seez ®, No. NSBT-4 | Bostik |
| Ace Thread Cutting Oil 26438 | Ace Hardware |
| Kel 110 Pure Silicone #110A | Kellogg's Professional Products, Inc. |
| Kelpro HI Temp C-100 ® | Huntington Vacuum Supplies |

Electrical Resistance Measurements

A 408-count tow was laid across two copper pads 1 cm apart on a printed wiring board. Contact was made to the copper pads using silver paint, and the resistance of the tow was measured with an ohm-meter.

Measurement of Wear Resistance

A 20×408-count tow was passed through a ceramic eyelet of diameter ½ inch and radius of curvature ½ inch. A standard weight (83-g) was attached to one of the 20×408-count tow. For a count of two cycles, the operator drew the 20×408-count tow through a distance of 4 inches and released it, whereupon the tow returned to its original position by the action of the weight.

Sulfurized iron-coated fibers were prepared in accordance with the present invention at various loadings of sulfur, with the percentages of sulfur doping in the iron coatings being determined on the basis of weight ratios of sulfur to iron, and qualitatively confirmed by scanning electron microscope/energy dispersive spectrometry (SEM/EDS) analyses. Coated fibers representative of the prior art where also prepared, in accordance with the teachings of the aforementioned prior art patents to Budd, Stalego, and Whitehurst.

Each of the various samples used in the comparison test comprised a 408-count Owens-Corning D Filament (5 μm diameter fiber) tow treated by the methods summarized in Table A below.

TABLE A

| Sample | Sample Type | Method of Preparation |
|---|---|---|
| 1 | Sized Glass Fibers | 408-Count Owens Corning D Filament (5 μm diameter fiber) tow with the starch/oil sizing as provided by the manufacturer. |
| 2 | Glass Fibers | 408-Count Owens Corning D Filament (5 μm diameter fiber) tow with starch/oil sizing removed by passing the fiber through a 650° C. oven for 45 seconds in air. |
| 3 | Iron Coated Glass (Fe/Glass Fibers) | Glass fibers (as in sample 2 above) coated with iron to a thickness of approximately 0.036 μm by the method of the Application. |
| 4 | Sulfurized Fe/Glass Fibers | Iron-coated glass fibers (as in sample 3 above) sulfurized to a level of 8% w/v S/Fe ratio by the sulfur-doping method of the Application. |
| 5 | Salt-doped Sulfurized Fe/Glass Fibers | Iron-coated glass fibers (as in sample 3 above) salt doped and then sulfurized to a level of 4% w/v s/[Fe + salt] ratio by the methods of the Application. |
| 6 | Fe/Glass Fibers Coated with Sulfur in Oil | Iron-coated glass fibers (as in sample 3 above) coated with a sulfur-containing oil. |
| 7 | Fe/Glass Fibers Coated with Sulfide in Oil | Iron-coated glass fibers (as in sample 3 above) coated with a molybdenum sulfide-containing oil by the method of Budd ('105) or Whitehurst ('981). |
| 8 | Fe/Glass Fibers Coated with Oxide in Oil | Iron-coated glass fibers (as in sample 3 above) coated with an oxide-containing oil by the method of Budd ('105) or Whitehurst ('981). |
| 9 | Fe/Glass Fibers Coated with Teflon | Iron-coated glass fibers (as in sample 3 above) coated with teflon. |
| 10 | Fe/Glass Fibers Coated with Silicone | Iron-coated glass fibers (as in sample 3 above) coated with silicone. |
| 11 | Fe/Glass Fibers Coated with Stearate Size | Iron-coated glass fibers (as in sample 3 above) coated with a stearate sizing. |
| 12 | Fe/Glass Fibers Coated with Polymer Size | Iron-coated glass fibers (as in sample 3 above) coated with a polymeric sizing. |
| 13 | Oxidized Fe/Glass Fibers | Iron-coated glass fibers (as in sample 3 above) exposed to heated oxygen to produce an oxide overcoat, as described in Stalego ('051) or Whitehurst ('981) |

TABLE A-continued

| Sample | Sample Type | Method of Preparation |
|---|---|---|
| 14 | Sulfurized Oxidized Fe/Glass Fibers | Oxidized iron-coated glass fibers (as in sample 13 above), sulfurized by the sulfur-doping method of the Application, using the same protocol as yielded the 20% sample of FIG. 2. |

Figure 7:
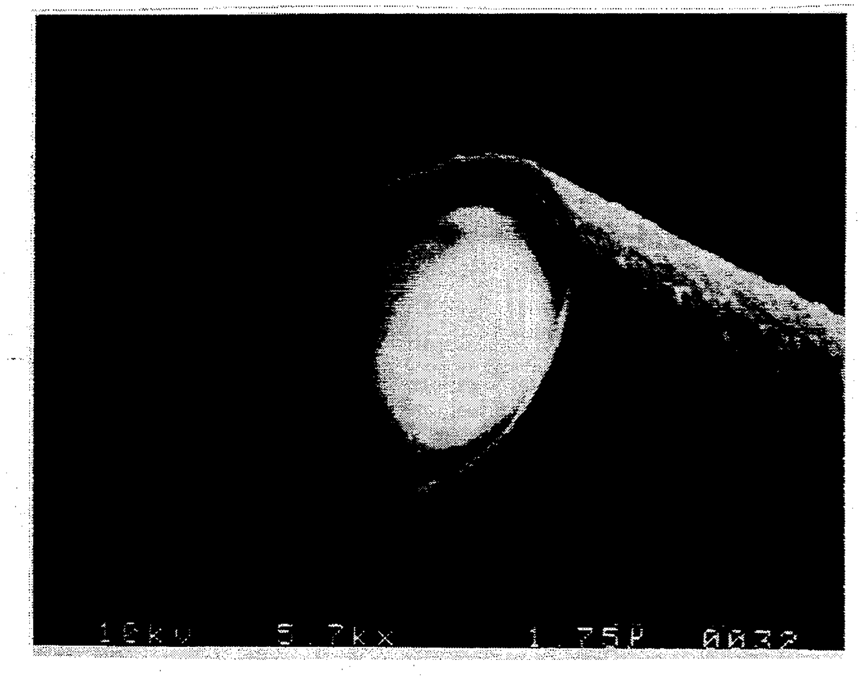
FIG. 7 is an electron photomicrograph, at magnification of 5700 times, of a sulfurized iron-coated glass fiber.
Figure 8:
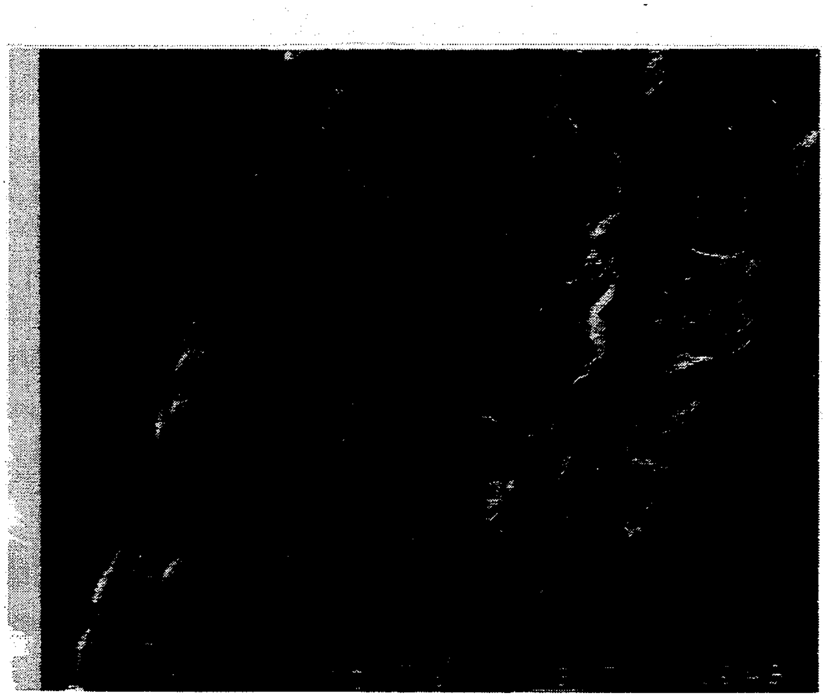
FIG. 8 is an electron photomicrograph, at magnification of 1030 times, of a tow of sulfurized iron-coated glass filaments, after exposure to air at 52% relative humidity at 20° C. temperature, for greater than 150 hours of exposure.
Figure 9:
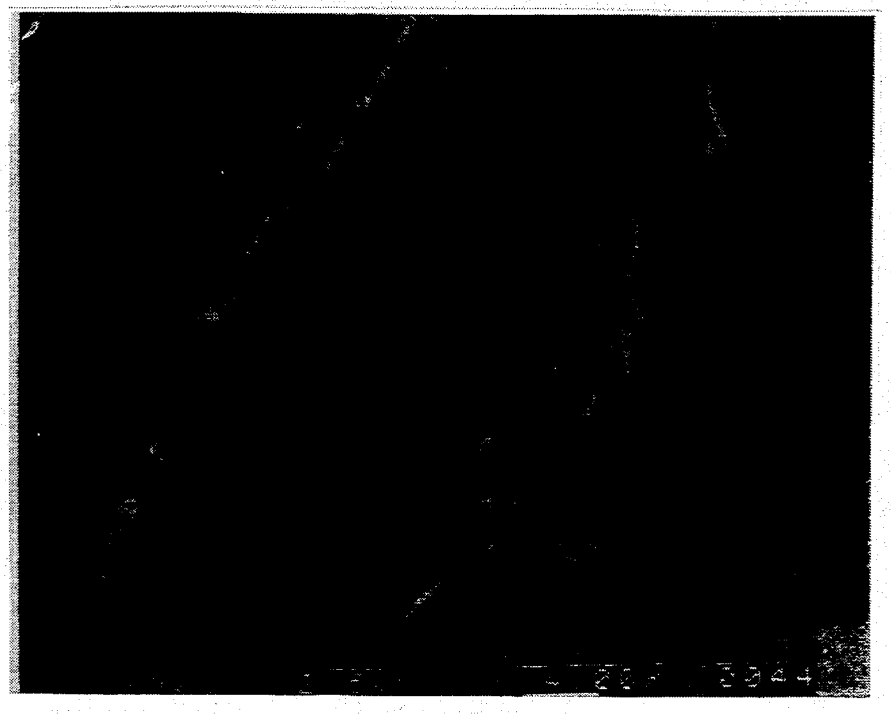
FIG. 9 is an electron photomicrograph, at magnification of 2500 times, of a sulfurized iron-coated glass filament, showing the corrosion morphology of the fiber.

In order to show the morphology of the sulfur-doped iron coatings, scanning electron micrographs were prepared of iron-coated fibers that were sulfurized to a level of 10% w/w S/Fe ratio by the sulfur-doping method of the present invention, with micrographs being taken before and after exposure to the environment (humidity chamber, >150 hours, 52% relative humidity, 20° C. These micrographs are shown in FIGS. 7–9, wherein FIG. 7 is a micrograph, taken before exposure, of a sulfurized iron-coated glass fiber representative of Sample 4 of Table A, FIG. 8 is a micrograph, taken after exposure, of a tow of such fibers exposed to air at 52% relative humidity and 20° C. temperature for greater than 150 hours, and FIG. 9 is a micrograph, taken after exposure, of a fiber from the tow of FIG. 8.

Figure 10:
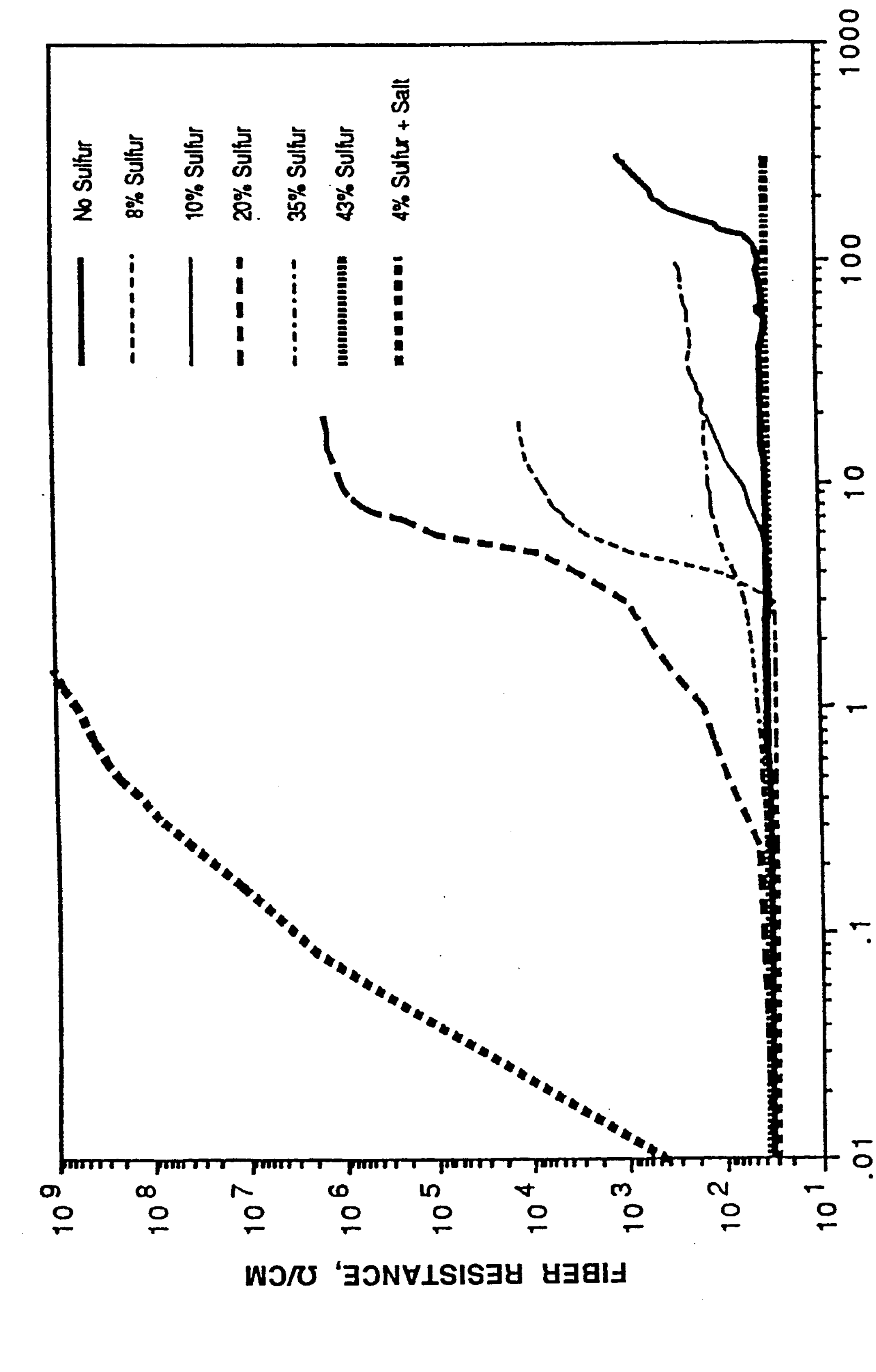
FIG. 10 is a graph of fiber resistance (D./cm) versus atmospheric exposure time, in hours, of various iron-coated glass fiber samples.

The time-dependent loss of fiber electrical conductivity upon exposure to the environment (room air, temperature 20°–24.5° C., relative humidity 48–56%) was measured for test samples as described above ("Electrical resistance measurements") as described, and the results are shown in FIG. 10 as plots of fiber resistance (Ω/cm) versus atmospheric exposure time (hours).

For the coated fiber samples prepared and listed in Table A above, the electrical resistance was measured initially and after 150 hours exposure to the atmosphere (room air, temperature 20°–24.5° C., relative humidity 48–56%) by the method described above ("Electrical resistance measurements"), and the resistance of the fibers to friction wear, measured as cycles to failure, was determined by the method described above ("Measurements of wear resistance"). The results of these experiments are tabulated below in Table B.

TABLE B

| Sample | Sample Type | Initial Resistance | Resistance after 150 Hrs | Cycles to Failure |
|---|---|---|---|---|
| 1 | Sized Glass Fibers | >30,000 MΩ/cm | >30,000 MΩ/cm | 134 |
| 2 | Glass Fibers | >30,000 MΩ/cm | >30,000 MΩ/cm | 211 |
| 3 | Iron Coated Glass (Fe/Glass) Fibers | 8.5 KΩ/cm | 278.8 KΩ/cm | 33 |
| 4 | Sulfurized Fe/Glass Fibers | 13.2 KΩ/cm | 72.0 KΩ/cm | 21 |
| 5 | Salt-doped Sulfurized Fe/Glass Fibers | 16.8 KΩ/cm | >30,000 MΩ/cm | 5 |
| 6 | Fe/Glass Fibers Coated with Sulfur in Oil | 29.8 KΩ/cm | 31.0 KΩ/cm | >1000 |
| 7 | Fe/Glass Fibers Coated with Sulfide in Oil | 27.6 KΩ/cm | 29.2 KΩ/cm | >1500 |
| 8 | Fe/Glass Fibers Coated with Oxide in Oil | 22.5 KΩ/cm | 22.7 KΩ/cm | 838 |
| 9 | Fe/Glass Fibers Coated with Teflon | 7.6 KΩ/cm | 5.1 KΩ/cm | 399 |
| 10 | Fe/Glass Fibers Coated with Silicone | 14.3 KΩ/cm | 17.3 KΩ/cm | 258 |
| 11 | Fe/Glass Fibers Coated with Stearate Size | 10.1 KΩ/cm | 12.1 KΩ/cm | 81 |
| 12 | Fe/Glass Fibers Coated with Polymer Size | 9.6 KΩ/cm | 12.2 KΩ/cm | 70 |
| 13 | Oxidized Fe/Glass Fibers | >30,000 MΩ/cm | >30,000 MΩ/cm | 3 |
| 14 | Sulfurized Oxidized Fe/Glass Fibers | >30,000 MΩ/cm | >30,000 MΩ/cm | 19 |

The results in Table B show that the coating of glass fibers with iron by the method of the present invention greatly decreased fiber electrical resistance, that the treatment of these iron-coated fibers by the sulfurizing and salt-doping/sulfurizing treatments of the present invention caused a greatly increased rate of loss of conductivity over time when the fibers were exposed to air (room air, temperature 20°–24.5° C., relative humidity 48–56%), and that treatment of the iron-coated fibers with prior art sulfide, oxide or other lubricious coatings significantly slowed the rate of loss of conductivity over time when the fibers were exposed to air, with the result that the conductivities of these last-mentioned fibers were more rather than less stable over time.

The results in Table B further show that the coating of glass fibers with iron in accordance with the present invention does not improve wear resistance, that the treatment of these iron-coated fibers with prior art sulfide, oxide or other lubricious coatings does increase wear resistance, and that the sulfurizing and salt-doping/sulfurizing treatments in accordance with the present invention decrease wear resistance.

While the preferred and illustrative embodiments of the invention have been described, it will be appreciated that numerous modifications, variations, and other embodiments are possible, and accordingly, all such modifications, variations, and embodiments are to be regarded as being within the spirit and scope of the present invention.

What is claimed is:

1. An article comprising a substrate element formed of a non-conductive material and having a sub-micron thickness of a sulfurized oxidizable conductive metal coating thereon comprising an unoxidized metal coating doped with from about 0.01 to about 35% by weight, based on the weight of unoxidized metal in the oxidizable metal coating of a reactive sulfur constituent by exposure of said unoxidized metal coating to a sulfur doping agent, to provide said doped sulfur constituent on said unoxidized metal coating, such that the sulfur constituent is (i) non-protective of the unoxidized metal coating in exposure to oxygen and/or moisture, and (ii) effective to promote the corrosion of the unoxidized metal when the article is exposed to atmospheric exposure conditions so that the unoxidized metal coating is oxidatively converted to a non-conductive metal oxide coating, at a corrosion rate which is greater than the corrosion rate of a corresponding article lacking such doped sulfur constituent on the unoxidized metal coating.

2. An article according to claim 1, wherein the substrate element is formed of a material comprising at least one component, selected from the group consisting of glasses, polymers, carbon, and ceramic materials.

3. An article according to claim 1, wherein the substrate element is formed of a glass material.

4. An article according to claim 1, wherein the substrate element is in the form of a filament.

5. An article according to claim 4, wherein the filament has a diameter of from about 0.5 to about 25 microns.

6. An article according to claim 1, wherein the oxidizable metal coating comprises a metal selected from the group consisting of iron, copper, nickel, tin, zinc, and mixtures and alloys thereof.

7. An article according to claim 1, wherein the oxidizable metal coating comprises a continuous sub-micron film of iron, ferrous metal, or ferrous alloy.

8. An article according to claim 1, wherein the oxidizable metal coating has a thickness of from about $2\times10^{-3}$ to about 0.25 micron.

9. An article according to claim 1, wherein the sulfurized oxidizable metal coating has a salt coated thereon.

10. An article according to claim 9, comprising from about 0.005 to about 25% by weight of salt, based on the weight of unoxidized metal, coated on the sulfurized oxidizable metal coating.

11. An article according to claim 1, wherein the sulfurized oxidizable metal coating is doped with from about 0.01 to about 10% by weight, based on the weight of unoxidized metal in the oxidizable metal coating, of elemental sulfur.

12. An article according to claim 1, wherein the sulfurized oxidizable metal coating has been sulfurized by exposure of the oxidizable metal coating to hydrogen sulfide gas for sufficient time and at sufficient concentration to form discontinuous sulfur-containing deposits on the oxidizable metal coating and thereby produce the sulfurized oxidizable metal coating.

13. An article according to claim 1, wherein the sulfur constituent comprises a metal sulfide whose metal moiety is the same as the metal of the metal coating.

14. A chaff article comprising a non-conductive fiber substrate having coated thereon a sub-micron thickness of a sulfurized oxidizable conductive metal coating comprising an unoxidized metal coating doped with from about 0.01 to about 35% by weight, based on the weight of unoxidized metal in the oxidizable metal coating of a reactive sulfur constituent by exposure of said unoxidized metal coating to a gaseous sulfide doping agent to provide said doped sulfur constituent on said unoxidized metal coating, such that the sulphur constituent is (i) non-protective of the unoxidized metal coating in exposure to oxygen and/or moisture, and (ii) effective to promote the corrosion of the unoxidized metal when the article is exposed to atmospheric exposure conditions so that the unoxidized metal coating is oxidatively converted to a non-conductive metal oxide.

15. An article according to claim 14, wherein the oxidizable metal coating comprises a metal selected from the group consisting of iron, copper, nickel, tin, zinc, and mixtures and alloys thereof.

16. An article according to claim 14, wherein the oxidizable metal coating comprises a continuous submicron film of iron, ferrous metal, or ferrous alloy.

17. An article according to claim 14, wherein the sulfurized oxidizable metal coating is doped with from about 0.01 to about 10% by weight, based on the weight of unoxidized metal in the oxidizable metal coating, of elemental sulfur.

18. An article according to claim 14, wherein the sulfurized oxidizable metal coating has been sulfurized by exposure of the oxidizable metal coating to hydrogen sulfide gas for sufficient time and at sufficient concentration to form discontinuous sulfur-containing deposits on the oxidizable metal coating and thereby produce the sulfurized oxidizable metal coating.

* * * * *